UNITED STATES PATENT OFFICE.

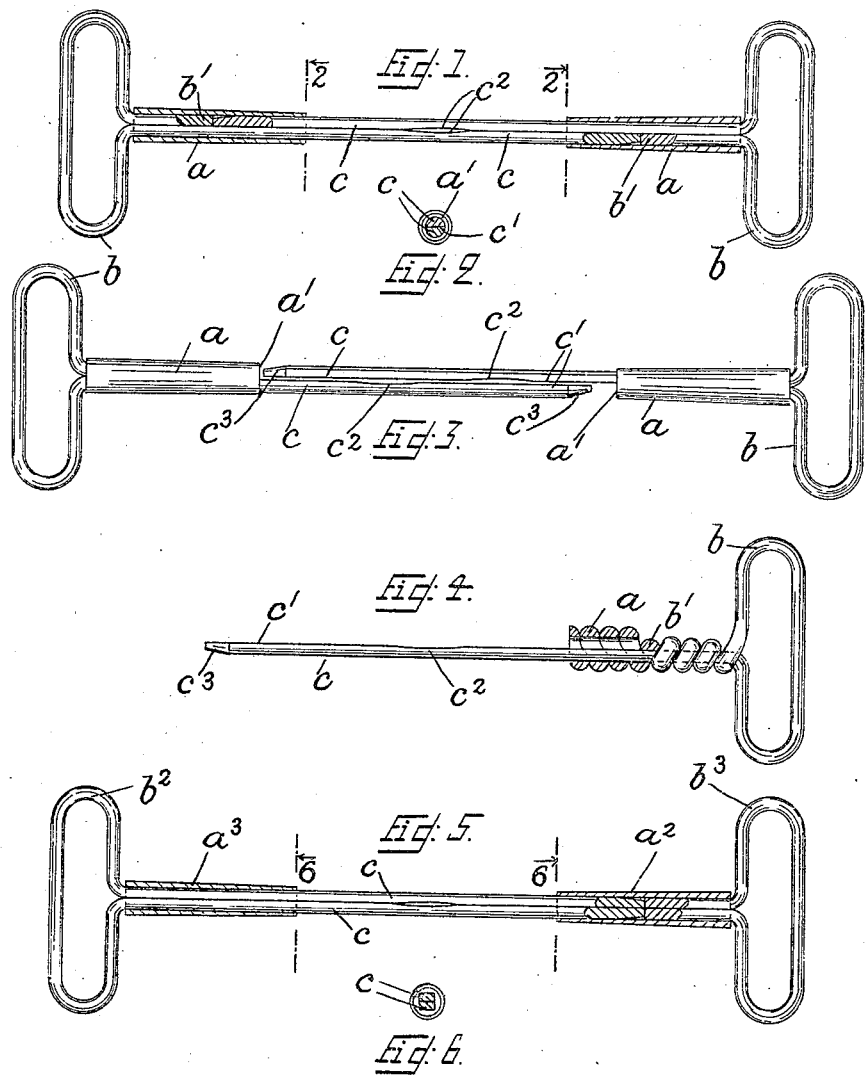

WILLIAM ARTHUR READ AND HENRY JAMES MILES, OF LONDON, ENGLAND.

KEY FOR REMOVING LIDS FROM SARDINE-TINS AND THE LIKE.

943,459.  Specification of Letters Patent.  Patented Dec. 14, 1909.

Application filed March 23, 1909. Serial No. 485,261.

*To all whom it may concern:*

Be it known that we, WILLIAM ARTHUR READ and HENRY JAMES MILES, subjects of the King of Great Britain and Ireland, and residents of London, England, have invented a certain new and useful Improvement in Keys for Removing Lids from Sardine-Tins and the Like; and we do hereby declare the following to be a full, clear, and exact description of the same.

This invention relates to an improved key for opening sardine tins, boxes, and the like by the removal of the lid by rolling it around the key, and has for its object to avoid the disadvantages incidental to keys hitherto used for the purpose which are so shaped or adapted as to prevent the subsequent removal of the lid from the key without the troublesome and dangerous operation of unrolling the lid from the key, and to enable the lid to be quickly and safely removed from the key so that a single key can be used for opening a plurality of such boxes in lieu of a fresh key being required for opening each box as hitherto.

On the accompanying drawings:—Figure 1 represents a sectional elevation of one form of the improved key, showing the parts in position for use; Fig. 2, represents a transverse section on the lines 2—2, Fig. 1; Fig. 3 represents an elevation of the key, showing the parts separated; Fig. 4 illustrates a detail of construction; Fig. 5 represents a view, corresponding to Fig. 1, of another form of the improved key; Fig. 6 represents a transverse section on the lines 6—6, Fig. 5.

Referring to Figs. 1 to 3, and 4, the device consists of two engageable and separable parts, each of which comprises a tube or socket, $a$, having a handle, $b$, at one end, and a finger, $c$, projecting from the other end. The tubes or sockets are preferably tapered externally toward their inner ends, $a^1$, and are shaped internally to accommodate the fingers, which are made of a half-round, rectangular or other suitable cross section so as to present flat inner meeting faces, $c^1$. Each face, $c^1$, is formed with a depression, $c^2$, at about its mid-length, and each finger is tapered at its free extremity, $c^3$, and is preferably slightly tapered from its mid-length toward its free extremity. The finger of one part of the device is preferably a little longer than the finger of the other part, as shown.

The finger of each part of the device is adapted, when its free extremity, $c^3$, is presented opposite the inner end, $a^1$, of the tube or socket of the other part (see Fig. 3), to be pushed thereinto, the extent of motion being limited by a stop, $b^1$, so that the two parts will be engaged and the fingers will be held together with the two depressions opposite one another so as to form an eye adapted to receive the tongue of the lid (see Fig. 1).

As shown in Figs. 1 to 3, the finger and handle of each part of the device can conveniently be formed in one piece driven tightly into the respective tube or socket so as to be permanently connected thereto; or, as shown in Fig. 4, the whole of each part of the device can conveniently be formed in one piece and the socket can be formed by coiling the material of which the part of the device is made around the respective finger.

When it is wished to remove a lid from, say, a sardine box, the two parts of the device are engaged as aforesaid and the tongue of the lid is inserted through the eye of the device, whereupon the lid can be easily stripped off the box by turning the device by means of the two handles and rolling the lid around the fingers, $c$, and tubes or sockets, $a$. The rolled lid can then be easily and safely removed from the device by separating the two parts of the device and sliding the rolled lid endwise from off the tube and finger on which it happens to remain. The tapered formation of the finger extremities, $c^3$, and the difference in the lengths of the fingers facilitate the engagement of the parts of the device, and the tapered formation of the tubes or sockets and of the fingers from their mid-lengths toward their free extremities facilitates the separation of the parts of the device and of the coiled lid from the device.

In a modification of the device (see Figs. 5 and 6) two opposite fingers, $c$, are provided with a single handle, $b^2$, and are adapted, at the free extremities which are tapered, to be engaged by and disengaged from a tube or socket, $a^2$, which is provided with a handle, $b^3$. In the construction shown, the fingers and handle, $b^2$, are formed in one piece and of rectangular cross section, and the fingers are driven tightly into a tube or socket, $a^3$, having an interior of square cross section and adapted to hold the fingers together at this end. The tube or socket, $a^2$, also has an interior of square cross section, so that both handles are adapted to turn the fingers.

What we claim as our invention and desire to secure by Letters-Patent is:—

1. A key for repeated use in removing lids from sardine tins and the like, comprising two parallel fingers adapted to engage the tongue of a lid between them, means for holding the fingers together at their adjacent extremities, and handles one at each end of the device for rotating the fingers and rolling the lid on the device, said holding means and said fingers being separable so as to permit of the rolled lid being readily slid endwise from off the device, substantially as described.

2. A key for repeated use in removing lids from sardine tins and the like, comprising two members each of which consists of a socket, a handle at one end of the socket, and a finger projecting from the other end of the socket, said fingers having flat inner sides, and the finger of each member being adapted to be engaged in the socket of the other member so that the two fingers will be held parallel together to receive the tongue of a lid between them, and the fingers being adapted to be separated from one another endwise to enable the rolled lid to be slid off the device.

3. A key for repeated use in removing lids from sardine tins and the like, comprising two members each of which consists of a socket, a handle at one end of the socket, and a finger projecting from the other end of the socket, said fingers being of different lengths and having flat inner sides which are formed with depressions, and the finger of each member being adapted to be engaged in the socket of the other member so that the two fingers will be held parallel together with the depressions opposite one another so as to form an eye to receive the tongue of a lid, and the fingers being adapted to be separated from one another endwise to enable the rolled lid to be slid off the device.

4. A key for repeated use in removing lids from sardine tins and the like, comprising two members each of which consists of a socket which is tapered externally toward one end, a handle at one end of the socket, and a finger projecting from the other end of the socket, said fingers being of different lengths and having flat inner sides which are formed with depressions and having tapered extremities, and the finger of each member being adapted to be engaged in the socket of the other member so that the two fingers will be held parallel together with the depressions opposite one another so as to form an eye to receive the tongue of a lid, and the fingers being adapted to be separated from one another endwise to enable the rolled lid to be slid off the device.

In testimony whereof we affix our signatures in the presence of two subscribing witnesses.

WILLIAM ARTHUR READ.
HENRY JAMES MILES.

Witnesses:
   CHARLES AUBREY DAY,
   ALFRED DAY.